No. 790,053. PATENTED MAY 16, 1905.
A. B. HENDRYX.
BIRD CAGE.
APPLICATION FILED MAR. 11, 1905.

No. 790,053. Patented May 16, 1905.

UNITED STATES PATENT OFFICE.

ANDREW B. HENDRYX, OF NEW HAVEN, CONNECTICUT.

BIRD-CAGE.

SPECIFICATION forming part of Letters Patent No. 790,053, dated May 16, 1905.

Application filed March 11, 1905. Serial No. 249,589.

*To all whom it may concern:*

Be it known that I, ANDREW B. HENDRYX, a citizen of the United States, residing at New Haven, in the county of New Haven and State of Connecticut, have invented a new and useful Improvement in Bird-Cages; and I do hereby declare the following, when taken in connection with the accompanying drawings and the letters of reference marked thereon, to be a full, clear, and exact description of the same, and which said drawings constitute part of this specification, and represent, in—

Figure 1:
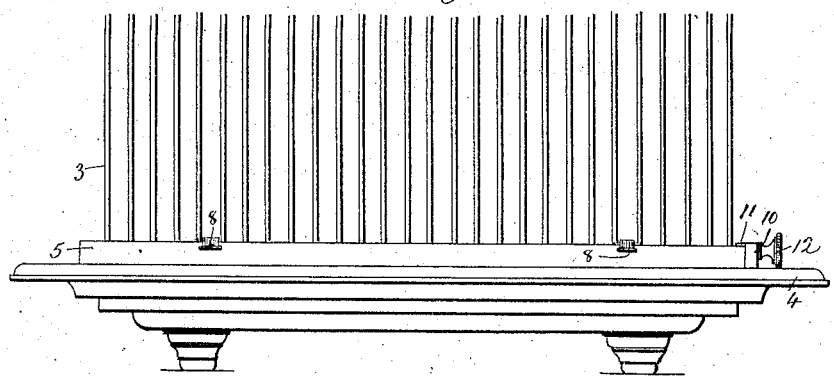
Figure 2:
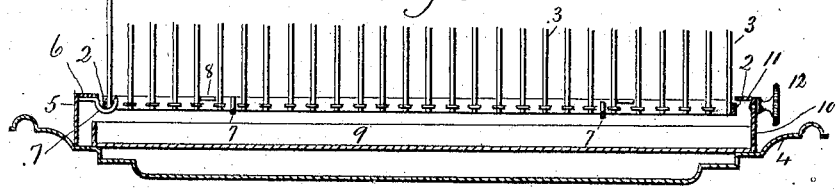
Figure 3:
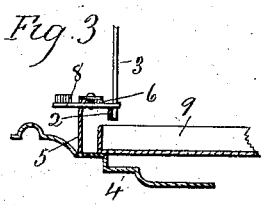
Figure 4:
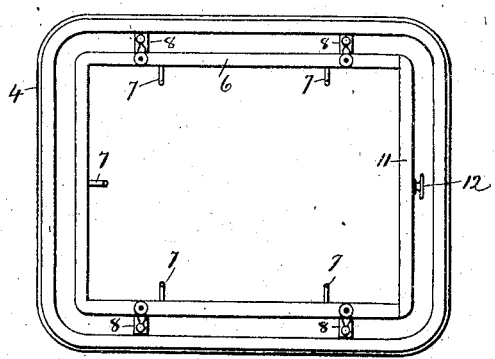

Figure 1, a side view of the lower portion of a bird-cage constructed in accordance with my invention; Fig. 2, a longitudinal sectional view of the same; Fig. 3, a broken sectional view showing the engagement of the cage-body with the base; Fig. 4, a top or plan view of the base with the cage removed.

This invention relates to an improvement in bird-cages, and particularly to that class which consists of a base and a cage adapted to be interlocked therewith, and especially to such as are provided with a drawer or pan which may be removed from the cage without disengaging the body portion from the base. In the usual construction of cages of this class if the pan is removable without disengaging the cage from the base the pan or drawer is inserted beneath the outer edge of the base and the body of the cage is as large or larger than the dimensions of the pan.

The object of the invention is to provide a base with an upwardly-extending rim and an inwardly-extending flange which will project over the edge of the pan, the pan being adapted to be inserted at one end of the base over the upper face thereof, the edge of the pan completing the rim around the base. When the pan is smaller than the cage, seeds and refuse collect beyond the edge of the pan and fall into the base, which must be removed to properly clean the cage, and a further advantage of my invention is that the pan extending beneath the flange catches all refuse and may be readily withdrawn for cleaning; and the invention consists in certain details of construction, as will be hereinafter described, and particularly recited in the claims.

In illustrating my invention I show only the base and the lower part of the cage, which may be of any approved design and construction except that it shall have a lower rim or bar 2, to which the upright wires 3 are connected in the usual manner. The base 4 is of substantially usual form, and near its outer edge I attach an upright rim 5, which extends on two sides and across one end. At the upper edge this rim is turned inward, forming a flange 6. Connected to this flange are hooks 7, which receive the lower edge 2 of the cage which sets below the upper face of the flange, and also attached to the flange are slides 8, more or less in number, which extend over the upper edge of the rim 2 to interlock the cage with the base, these slides being of usual construction. In connection with such a cage I employ a pan 9, corresponding substantially in dimensions with the inner dimensions of the rim 5, and having at its forward end a front 10, having an inwardly-extending upper edge 11, which with the front completes the rim and flange around the base of the cage, the drawer front being provided with a suitable knob or handle 12, by which it may be withdrawn. As the edge of the drawer extends beneath the flange 6 and as the cage sets within the flange, it follows that the drawer is of greater dimensions than the dimensions of the cage, so that all refuse falling within the cage must necessarily fall within the pan, and this pan and its contents may be readily withdrawn without disengaging the body of the cage from the base. This rim and flange not only serve to deflect all refuse into the pan, but give a finished appearance to the cage and permit of a substantially flat base, whereas cages with a drawer arranged in the base must usually be comparatively deep.

Having fully described my invention, what I claim as new, and desire to secure by Letters Patent, is—

1. A bird-cage comprising a base, a rim extending upward therefrom and having an inwardly-extending flange, a cage adapted to set within the said flange and be secured thereto, and a pan in said base the edges of which extend beneath said flange, substantially as described.

2. A bird-cage comprising a base, an upwardly-extending rim arranged at three sides thereof, a bird-cage body located within said flange and secured thereto, and a pan having a front corresponding to the rim and flange and completing the fourth side of the base, said pan extending beneath the said flange, substantially as described.

In testimony whereof I have signed this specification in the presence of two subscribing witnesses.

ANDREW B. HENDRYX.

Witnesses:
EDWARD N. PECK,
ARTHUR B. ALLING.